United States Patent
Tetart et al.

(10) Patent No.: US 10,538,067 B2
(45) Date of Patent: Jan. 21, 2020

(54) USE OF POLYMER FILM FOR PACKAGING A CULTURE MEDIUM

(71) Applicant: BIOMERIEUX, Marcy l'Etoile (FR)

(72) Inventors: Bruno Tetart, Craponne (FR); Nathalie Simon, Grézieu la Varenne (FR)

(73) Assignee: BIOMERIEUX, Marcy l'Etoile (FR)

( * ) Notice: Subject to any disclaimer, the term of this patent is extended or adjusted under 35 U.S.C. 154(b) by 519 days.

(21) Appl. No.: 15/103,056

(22) PCT Filed: Dec. 19, 2014

(86) PCT No.: PCT/FR2014/053466
§ 371 (c)(1),
(2) Date: Jun. 9, 2016

(87) PCT Pub. No.: WO2015/092328
PCT Pub. Date: Jun. 25, 2015

(65) Prior Publication Data
US 2016/0354998 A1 Dec. 8, 2016

(30) Foreign Application Priority Data
Dec. 20, 2013 (FR) ...................................... 13 63169

(51) Int. Cl.
*B32B 27/08* (2006.01)
*B32B 27/36* (2006.01)
(Continued)

(52) U.S. Cl.
CPC .............. *B32B 27/08* (2013.01); *B32B 3/266* (2013.01); *B32B 27/36* (2013.01); *B65B 9/02* (2013.01);
(Continued)

(58) Field of Classification Search
CPC ........... B65B 9/02; B65B 51/10; B65B 55/08; B32B 27/36; B32B 3/266; B32B 27/08;
(Continued)

(56) References Cited

U.S. PATENT DOCUMENTS 5,458,899 A * 10/1995 Floyd .................... A23L 3/0155
426/302
5,505,950 A * 4/1996 Floyd .................... A23L 3/0155
206/524.8
(Continued)

FOREIGN PATENT DOCUMENTS

EP 0 087 031 A2 8/1983
EP 0 516 094 A1 12/1992
(Continued)

OTHER PUBLICATIONS

Mar. 25, 2015 International Search Report issued in International Patent Application No. PCT/FR2014/053466.
(Continued)

*Primary Examiner* — Nathaniel C Chukwurah
*Assistant Examiner* — Lucas E. A. Palmer
(74) *Attorney, Agent, or Firm* — Oliff PLC

(57) ABSTRACT

A polymer film for packaging at least one microorganism culture medium includes at least one layer of polyethylene terephthalate and at least one heat-sealing layer, such as polyethylene. The polymer film has an average water vapour permeability of between 10.0 $g/m^2 \times 24$ hours and 80.0 $g/m^2 \times 24$ hours.

20 Claims, 3 Drawing Sheets

Figure 1:
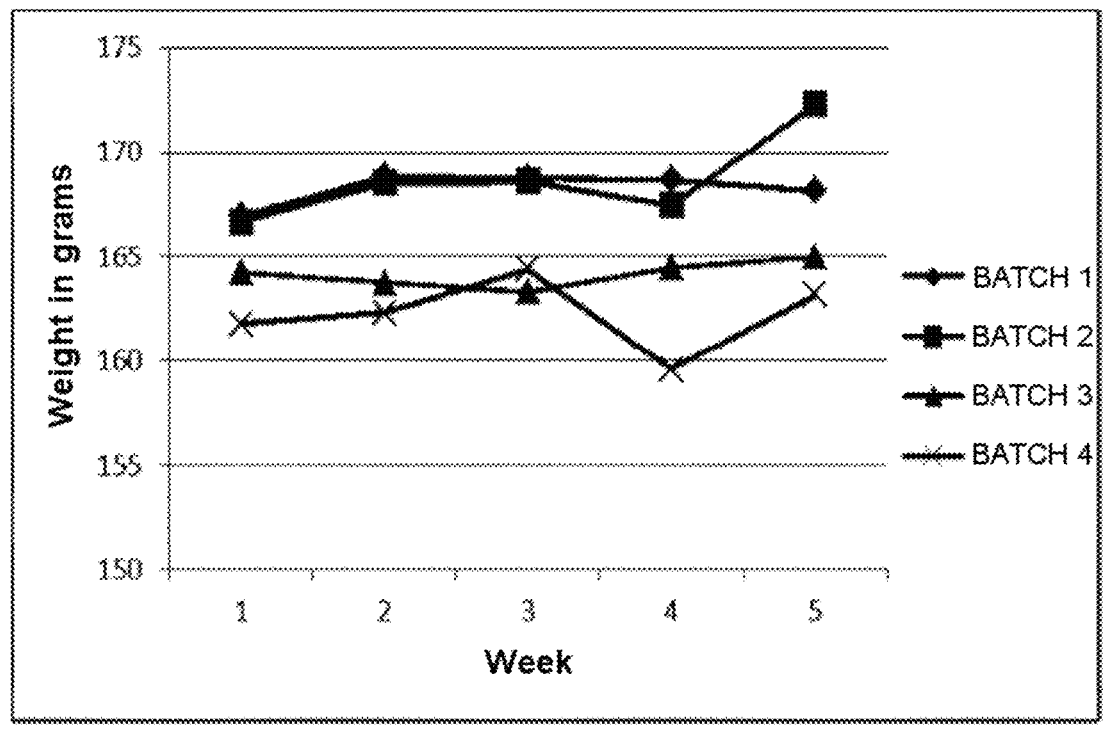

(51) Int. Cl.
*B32B 3/26* (2006.01)
*B65B 51/10* (2006.01)
*B65B 55/08* (2006.01)
*B65B 9/02* (2006.01)

(52) U.S. Cl.
CPC .............. B65B 51/10 (2013.01); B65B 55/08 (2013.01); *B32B 2307/304* (2013.01); *B32B 2307/724* (2013.01); *B32B 2439/00* (2013.01); *B32B 2535/00* (2013.01)

(58) Field of Classification Search
CPC ........ B32B 2307/304; B32B 2307/724; B32B 2439/00; B32B 2535/00
USPC ............................................ 53/426; 428/500
See application file for complete search history.

(56) References Cited

U.S. PATENT DOCUMENTS

| | | | | |
|---|---|---|---|---|
| 5,747,082 A * | 5/1998 | Floyd | ................... | A23B 7/0433 206/204 |
| 5,789,076 A * | 8/1998 | Isohata | .............. | B01J 20/28033 428/315.9 |
| 5,804,241 A * | 9/1998 | Isohata | .............. | B01J 20/28033 426/124 |
| 6,200,582 B1 * | 3/2001 | Iwamoto | ................ | A01N 31/08 424/404 |
| 6,491,993 B1 * | 12/2002 | Forbes | ............... | B01J 20/28016 428/34.3 |
| 6,525,165 B1 * | 2/2003 | Tsukamoto | ............. | B32B 27/36 528/308 |
| 9,801,784 B2 * | 10/2017 | Yoshida | ................ | A61J 1/1487 |
| 2006/0246242 A1* | 11/2006 | Siegel | ....................... | A23B 4/10 428/34.1 |
| 2010/0011708 A1* | 1/2010 | Alloin | ........................ | C08J 5/18 53/426 |
| 2010/0126991 A1* | 5/2010 | Kimura | .................. | B32B 27/00 220/200 |
| 2016/0355778 A1* | 12/2016 | Tetart | ..................... | B65B 11/48 |

FOREIGN PATENT DOCUMENTS

| | | | | |
|---|---|---|---|---|
| EP | 0516094 A1 * | 12/1992 | ......... | B01D 67/0027 |
| FR | 2913021 A1 | 8/2008 | | |
| JP | WO 2006118034 A1 * | 11/2006 | ............ | B32B 27/32 |
| WO | 2006/118034 A1 | 11/2006 | | |

OTHER PUBLICATIONS

Mar. 25, 2015 Written Opinion of the International Searching Authority issued in International Patent Application No. PCT/FR2014/053466.

* cited by examiner

USE OF POLYMER FILM FOR PACKAGING A CULTURE MEDIUM

Many polymer films, capable of being used for packaging products, are present on the market. Mention may in particular be made of films for food-related used, such as polyamide (PA), polyethylene terephthalate (PET) or polyvinyl chloride (PVC) films.

When interest is shown more particularly in the field of in vitro diagnosis, which is the applicant's field of activity, and in particular in films used for bagging culture media, it is noted that the materials normally used are materials which have a low barrier property characterized by a high permeability to water vapour (>120 g/m$^2$×24 hours). Such a material is for example cellophane. This material has the advantage of allowing the water contained in the ready-to-use agar culture media to evaporate and to pass through the film. This then prevents excessive condensation inside the bag consisting of the cellophane film. Conversely, the main drawback is that, since water vapour passes through the film, the moisture content inside is very low, leading to greater and therefore premature drying out of the culture medium. The shelf life of the product is therefore affected by this.

Other materials also used for bagging culture media have, for their part, a high barrier property characterized by a low permeability to water vapour (<5 g/m$^2$×24 hours). This low permeability to water vapour does not make it possible to evacuate the considerable condensation which forms in dishes of ready-to-use agar media, in particular after the media have been poured. It follows that this water remains in the bag until the latter is opened by the final user, generating spots and stains, which is totally unacceptable. Such products are, for example, polyolefins, such as polypropylenes (PPs) or polyethylene (PE). Polyolefins are widely used as packaging material. However, the processes for obtaining such materials mean that the latter have a very low permeability to water vapour. Moreover, materials comprising two complexed films, such as PA+PE films, intended to accentuate their water-vapour-barrier property, are also found. Thus, materials of this type have water-vapour-permeability values lower than about ten grams/m$^2$×24 hours. Known solutions for limiting the amount of water remaining in the bag until opened consists of the use of desiccants such as silica gels in the form of sachets. However, such a method makes it necessary to add an amount of desiccant to each of the bags, thus leading to increased manufacturing costs and a considerable amount of waste.

Finally, other materials also used for bagging culture media comprise a monolayer consisting only of non-oriented PA of "cast" type, and furthermore an amount of PVC and/or polyvinylidene chloride (PVDC) used as basic consistent of a film-sealing coating layer. The advantage of this technique is to be able to modulate the water vapour permeability by varying the amount of coating deposited on the PA film. Materials of this type have a water vapour permeability of between 35 g/m$^2$×24 hours and 110 g/m$^2$×24 hours. However, the processes for producing these films do not make it possible to control the amount of coating deposited on the surface of the film. As a result, the film obtained has a water vapour permeability range which is very variable for the same manufacturing batch, Consequently, the use of this type of film for producing culture media packaging does not make it possible to guarantee a precise shelf life.

It follows that companies which produce agar culture media are still waiting for packaging capable of preserving said culture media, under optimal conditions, mainly in an environment sufficiently rich in water vapour to prevent them from drying out prematurely, but also sufficiently low in water vapour to prevent excessive condensation in the bag, in particular at ambient temperature, in a manner which is predictable and is not very variable over time. Such films should make it possible to limit the agar weight loss kinetics and also the risk of dehydration of the culture media without degrading the level of exudation of the packaging. These properties must, moreover, be combined with a visual rendering in accordance with customer expectations, in particular in terms of transparency, and also a satisfactory resistance to stretching.

It is to the inventors' credit to have demonstrated that it is possible to use, for the purposes of packaging microorganism culture media, films comprising at least one layer of polyethylene terephthalate and at least one heat-sealing layer and having an average water vapour permeability of between 10.0 g/m$^2$×24 hours and 80.0 g/m$^2$×24 hours. The use of these particular materials allows better control of the shelf life, whatever the storage and transportation conditions, storage and transportation at ambient temperature being possible.

Thus, a first objective of the present invention is to provide a use of a film having physical properties, particularly in terms of water-vapour-barrier capacity, capable of allowing an improved and less variable shelf life of microorganism culture media under an atmosphere with a controlled moisture content.

A second objective of the present invention is to provide a use of a film making it possible to reduce the amount of agar present in the microorganism culture medium.

A third objective of the present invention is to provide a use of a thin flexible film having, moreover, a limited cost price.

A fourth objective of the present invention is to provide a use of an easily sealable film for producing a packaging sachet for microorganism culture media.

A fifth objective of the present invention is to provide a use of a film capable of meeting standards in terms of aesthetic appearance, particularly in terms of transparency and feel.

A sixth objective of the present invention is to provide a use of a film capable of meeting standards in terms of tensile strength and of elastic deformation.

A seventh objective of the present invention is to provide a use of a film having physical properties, in particular in terms of water-vapour-barrier capacity, capable of allowing an improved shelf life whatever the temperature conditions.

An eight objective of the present invention is to provide a use of a film having physical properties, particularly in terms of water-vapour-barrier capacity, capable of allowing a decrease in the agar weight loss kinetics and capable of allowing a better stability of the agar weight loss kinetics over time, whatever the temperature conditions.

Another objective of the present invention is to provide a use of a film allowing the production of a reusable and/or recloseable packaging.

These objectives, among others, are achieved by the present invention which relates firstly to the use of a polymer film for packaging at least one microorganism culture medium, said film comprising at least one layer of polyethylene terephthalate and at least one heat-sealing layer, such as polyethylene, said film having an average water vapour permeability of between 10.0 g/m$^2$×24 hours and 80.0 g/m$^2$×24 hours, preferentially between 10.0 g/m$^2$×24 hours and 60.0 g/m$^2$×24 hours, more preferentially between 10.0 g/m$^2$×24 hours and 30.0 g/m$^2$×24 hours.

The term "polymer film" is intended to mean a material comprising at least one layer of a polymer material, without size limitation, such as polyethylene terephthalate. Such films can be produced by extrusion or coextrusion in order to obtain a film comprising several layers, each having their own qualities.

The various measurements of water vapour permeability of the polymer films described in the present invention are determined at 38° C. and 90% relative humidity according to standard NF ISO 2528 (September 2001).

The various measurements of weight per unit of surface area are determined using the UNE-EN ISO 536 method.

The term "culture medium" is intended to mean a medium comprising all the constituents required for the survival and/or growth of microorganisms, deposited on a support. In practice, those skilled in the art will choose the culture medium as a function of the target microorganisms, according to criteria that are completely known and within the scope of those skilled in the art. A culture medium may be in dehydrated or agar form. In the case of the agar form, the culture medium is contained in a Petri dish. Petri dishes generally consist of a base, into which the agar culture medium, also called agar, is poured while hot, and a lid. The external parts of the base and of the lid cooperate in order to be able to stack several Petri dishes. Generally, stacks of ten dishes are produced for packaging and transportation.

The term "heat-sealing layer" is intended to mean a polymer layer capable of at least partially securing, under the effect of heat, two superimposed edges on at least one side of a film. Preferentially, the securing step is carried out by heat-sealing at a temperature of between 100 and 170° C. Examples of materials that can constitute such a layer are polyethylene, polypropylene or as polyvinyl chloride.

One advantage of the use of a film having a polyethylene terephthalate layer and at least one heat-sealing layer, such as polyethylene, is that of obtaining a reusable and/or recloseable packaging for culture medium, said packaging being non-stretchable. Contrary to the use of stretchable films such as polyvinyl chloride films, the packaging thus formed by heat sealing can continue to contain or maintain one or more culture media once open. An operator can thus easily move the packaging and its content without risk of causing one or more culture media to fall. Stretchable films are known to tear when opening the packaging, thus preventing any subsequent handling thereof. Furthermore, there is a risk of the media contained by this type of packaging no longer being suitably maintained in a stack after opening.

Advantageously, the film used according to the invention is a non-stretchable film. More advantageously, the heat-sealing layer of the film is non-stretchable in order to make the film used according to the invention non-stretchable.

Preferentially, the film used has an elongation at break of less than 250%, whatever the direction of measurement (machine or tranverse direction). More preferably, the film used has an elongation at break of less than 125%, whatever the direction of measurement (machine or transverse direction), allowing it to be not very ductile.

Preferentially, the film used has a minimal tensile strength of 40N/15 mm (ASTM D-882), whatever the direction of measurement (machine or transverse direction). More preferentially, the film used has a minimal tensile strength of 50N/15 mm (ASTM D-882), whatever the direction of measurement (machine or transverse direction), allowing it to be stronger.

Another advantage of the use of films according to the invention is that of being able to guarantee a shelf life of the culture media whatever the batch packaged. This is because the water vapour permeability to films used according to the invention is not very variable at all for the same manufacturing batch. This is in particular due to the fact that they do not have a coating layer and can be obtained directly by extrusion or complexing.

An average water vapour permeability of between 10.0 $g/m^2 \times 24$ hours and 30.0 $g/m^2 \times 24$ hours makes it possible to guarantee a particularly long shelf life of culture media, in particular greater than 6 months, depending on the storage conditions, while at the same time preserving the quality of the culture medium or media packaged, and to allow their use in a compliant manner.

According to one preferential characteristic, the film used for packaging at least one microorganism culture medium is transparent. This transparency makes it possible in particular to identify by any means the culture medium packaged without opening it. This transparency makes it possible in particular to recognize a bar code present on the culture medium support using a bar code reader or any other imaging means. Another advantage is also that of being able to see the good quality of the culture medium while searching for any defects in appearance and/or contaminations of the culture medium before opening the packaging.

Advantageously, the film used for packaging at least one microorganism culture medium comprises a second layer of polyethylene terephthalate. This second layer makes is possible to seal the material in order to be able to manufacture a sachet. For this, the two layers are assembled using a solvent (polyurethane)-based two-component (PU) adhesive. The second layer is made sealable by a lacquer for APET (amorphous polyethylene terephthalate) based on isophthalic acid.

Alternatively, other adhesives allowing the adhesion of the two layers of polyethylene terephthalate, such as acrylic-based adhesives, can be used. Preferentially, the adhesive is distributed in a proportion of a few grams per $m^2$, more preferentially between 2 $g/m^2$ and 3 $g/m^2$ of film.

According to another preferential characteristic, the film used for packaging at least one microorganism culture medium comprises at least one microperforated layer.

The "microperforated" is intended to mean any means capable of modifying the water vapour permeability of a polymer layer by producing perforations having sizes of between 10 μm and 50 μm. The number and the spacing of the perforations also make it possible to modify the water vapour permeability of a polymer layer in a controlled manner. Preferentially, the microperforations are produced by a laser. More preferentially, a single layer of polyethylene terephthalate is microperforated. Even more preferentially and in the case where the film comprises two layers of polyethylene terephthalate, these two layers are microperforated.

According to another preferential characteristic, the film used for packaging at least one microorganism culture medium has a thickness of between 20 and 80 μm, preferentially between 30 and 50 μm, more preferentially between 20 and 40 μm. A thickness of between 20 and 80 μm makes it possible to guarantee resistance to tearing and an acceptable visual appearance, allowing the operator to easily visualize the type of culture medium packaged in the sachet formed by the film. A thickness of between 30 and 50 μm, or between 20 and 40 μm, makes it possible to limit the purchase cost and the use of material while guaranteeing an acceptable visual appearance, it being possible for the thickness range to be adjusted to the appearance of the culture medium packaged and to the desired resistance to tearing.

Another subject of the invention relates to the use of a polymer film as described above, for producing a sachet intended for the packaging of at least one microorganism culture medium.

Another subject of the invention relates to a process for packaging at least one culture medium, comprising the steps consisting in:
- placing the culture medium or media on a film as described above, on the heat-sealing layer of said film;
- covering the culture medium or media with a portion, which has remained free, of said film or with another film, such that the heat-sealing layers are facing one another;
- securing the edges of the film or of the two films, such that the culture medium or media is or are trapped in the sachet thus formed.

Preferentially, the film(s) is (are) presterilized. The sterilization method may be irradiation with radiation taken from the group consisting of gamma-rays and/or beta-rays.

Preferentially, the securing step is a heat-sealing step at a temperature of between 100 and 170° C.

According to another preferential characteristic, the packaging process according to the invention also comprises the additional steps consisting in:
- placing the sachet thus obtained inside a second sachet and
- sealing said second sachet.

According to another preferential characteristic, the packaging process according to the invention also comprises the additional steps consisting in:
- placing the second sachet thus obtained inside a third sachet and
- sealing said third sachet.

According to another preferential characteristic, said second and/or third sachets of the packaging process according to the invention consist of a material taken from the group comprising: cellophane, polyolefins and polyamides.

According to another preferential characteristic, said second and/or third sachets of the packaging process according to the invention consist of a film comprising at least one layer of polyethylene terephthalate and at least one heat-sealing layer, such as polyethylene, said film having an average water vapour permeability of between 10.0 g/m²×24 hours and 80.0 g/m²×24 hours, preferentially between 10.0 g/m²×24 hours and 60.0 g/m²×24 hours, more preferentially between 10.0 g/m²×24 hours and 30.0 g/m²×24 hours.

Another subject of invention also relates to the use of a film as described above for packaging at least one culture medium in an isolator or in a laminar air flow hood. The advantage of the use of such a film in this type of application is that of being able to decontaminate the outside of a packaging formed by a said film without risk of damaging the culture medium or media present in the packaging or of destroying any microorganisms present on the culture medium for analysis. Indeed, such a film is impermeable to the principal decontaminating gases used in isolators, such as hydrogen peroxide ($H_2O_2$) or peracetic acid ($C_2H_4O_3$).

The objectives and advantages of the present invention will be understood more clearly on reading the following examples, which are in no way limiting, with reference to the drawing.

FIG. 1 shows the measurements of the weights of the complete stacks of dishes week by week for batches 1 to 4. The stacks of the batches shown in this figure are stored at a temperature of between 2 and 8° C.

Figure 2:
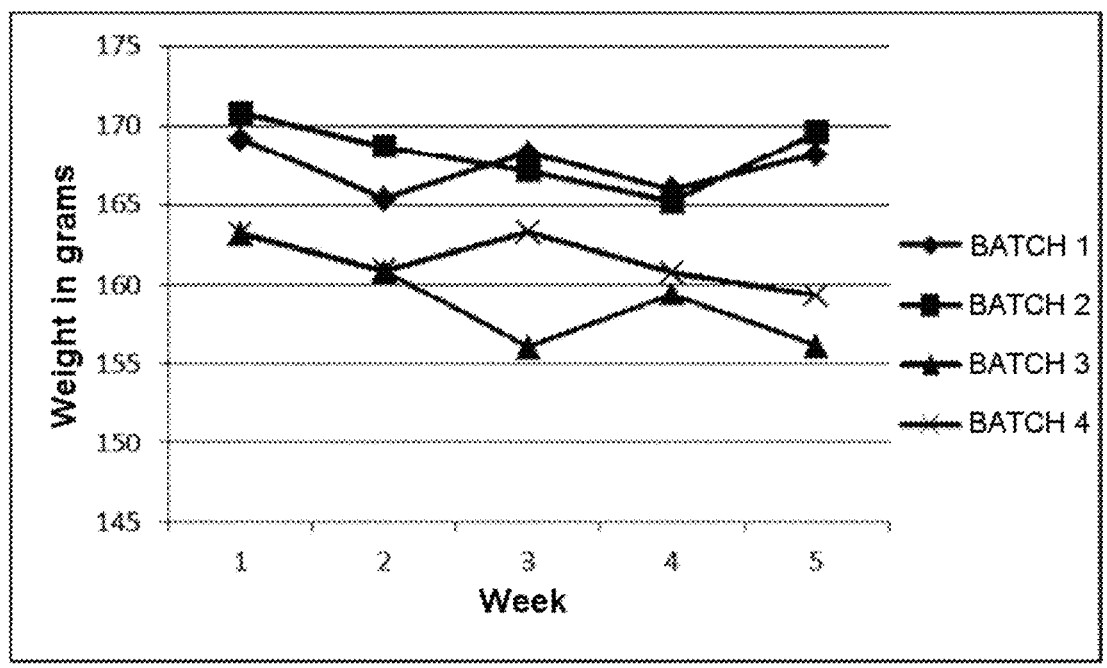

FIG. 2 shows the measurements of the weights of the complete stacks of dishes week by week for batches 1 to 4. The stacks of the batches shown in this figure are stored at ambient temperature.

Figure 3:
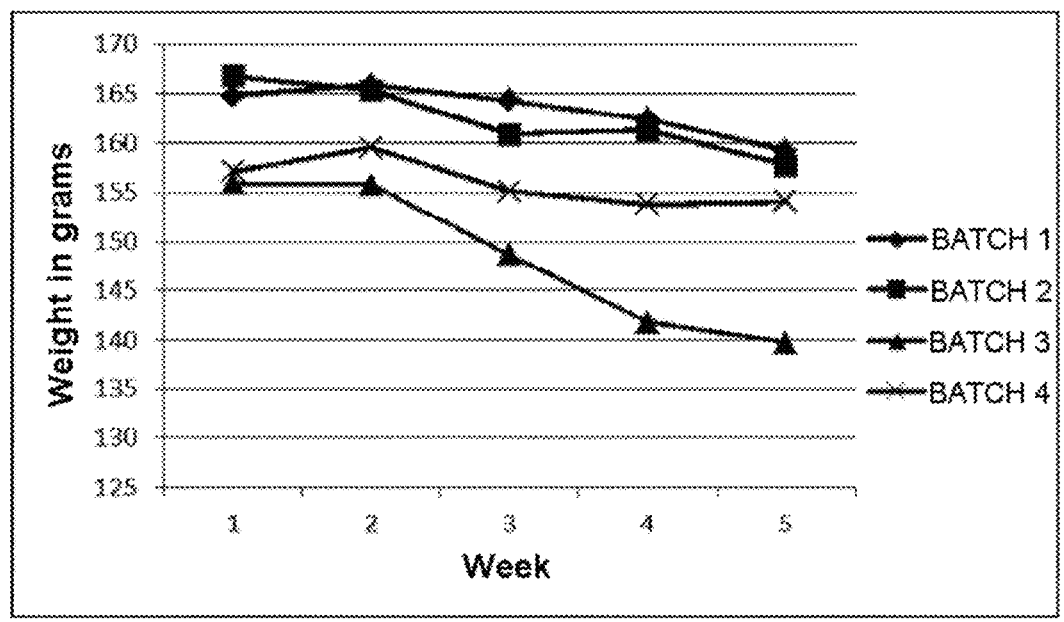

FIG. 3 shows the measurements of the weights of the complete stacks of dishes week by week for batches 1 to 4. The stacks of the batches shown in this figure are stored at a temperature of between 30 and 35° C.

Figure 4:
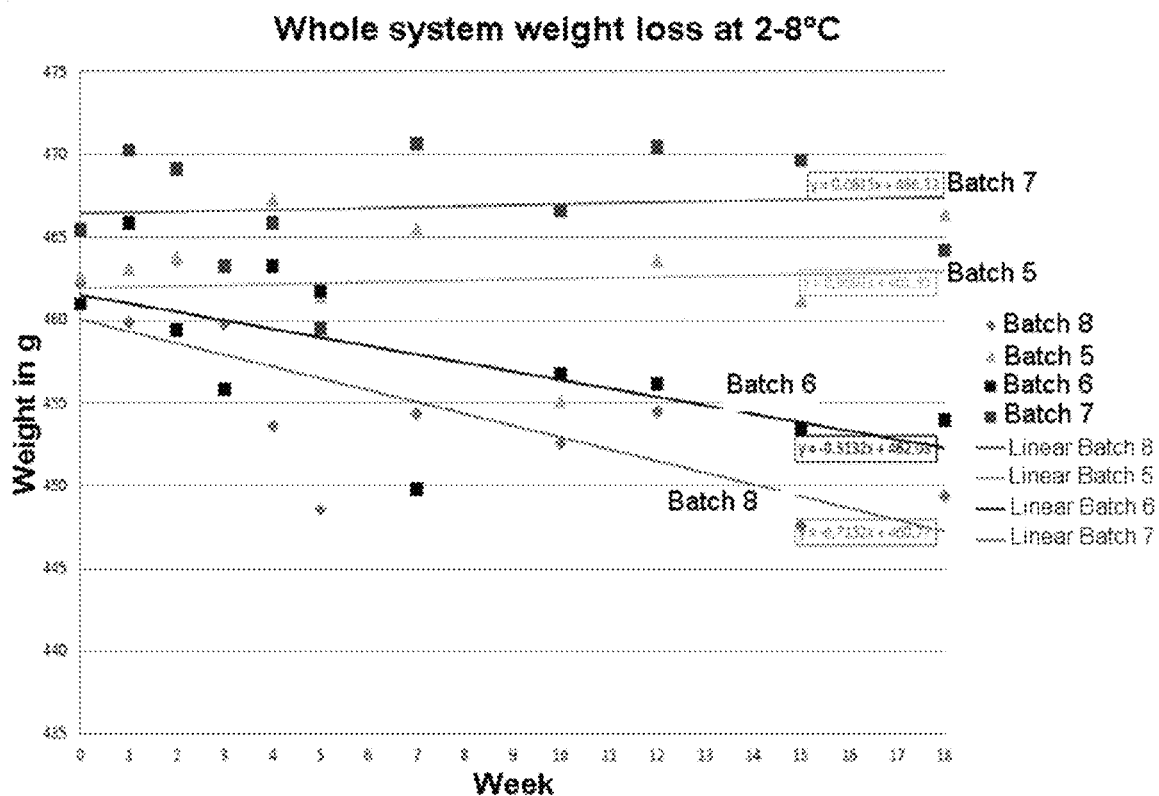

FIG. 4 shows the measurements of the weights of the complete stacks of dishes week by week for batches 5 to 8. The stacks of the batches shown in this figure are stored at a temperature of between 2 and 8° C.

Figure 5:
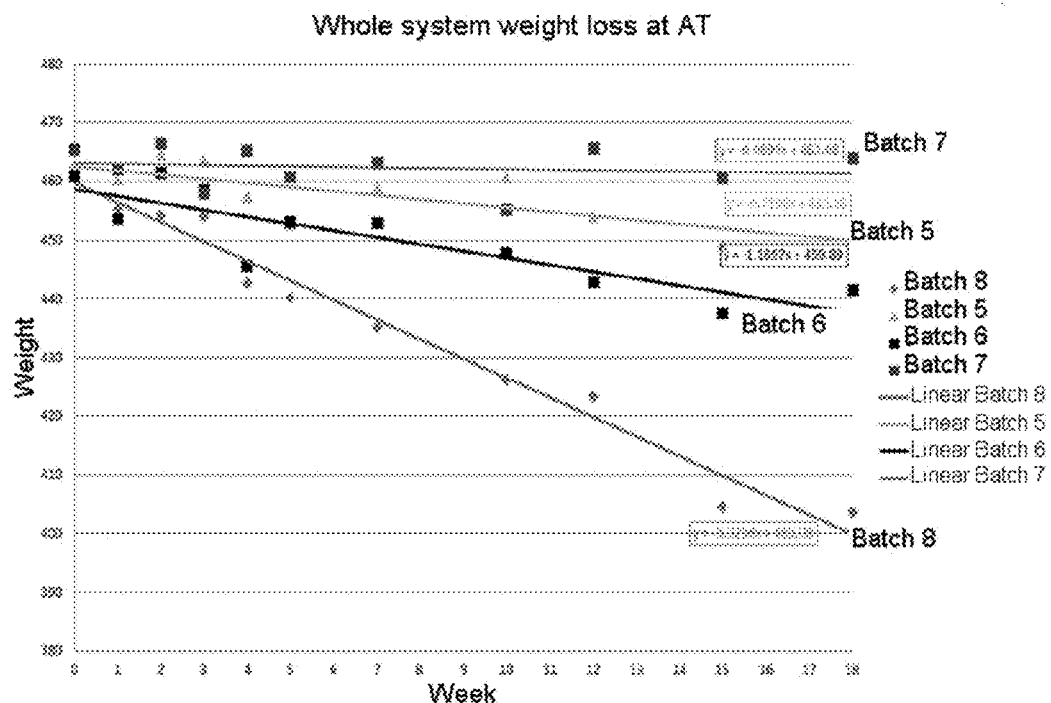

FIG. 5 shows the measurements of the weights of the complete stacks of dishes week by week for batches 5 to 8. The stacks of the batches shown in this figure are stored at ambient temperature.

Figure 6:
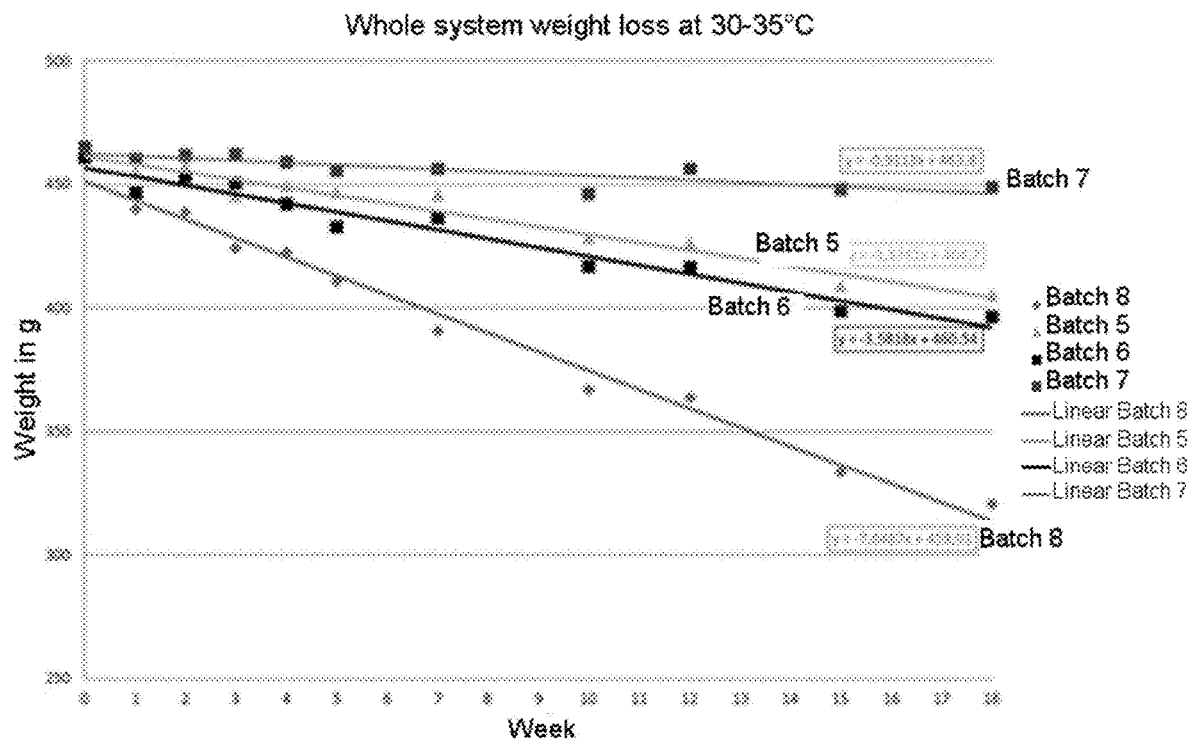

FIG. 6 shows the measurements of the weights of the complete stacks of dishes week by week for batches 5 to 8. The stacks of the batches shown in this figure are stored at a temperature of between 30 and 35° C.

EXAMPLE 1

Various batches of Petri dishes are formed. Each of the batches contains ten agar culture media of TSA (trypcase soy agar) type, manufactured by the applicant and sold under bioMérieux reference Count-Tact™ GTS.

The first batch, BATCH 1, comprises three stacks of ten Petri dishes, each stack being packaged in a sachet made from a PET/PE film, called FILM A, having a thickness of 32 μm. This film is composed of a transparent layer of linear low-density polyethylene having a thickness of 20 μm and a weight per unit of surface area of 18.4 g/m² to +/−12%, of a layer of (full face) adhesive having a weight per unit of surface area of 2.5 g/m² to +/−0.6 g/m² and of a transparent layer of PET having a thickness of 12 μm and a weight per unit of surface area of 16.8 g/m² to +/−4%.

The first sachet thus formed is then packaged in two successive sachets made from a cellophane film.

The second batch, BATCH 2, comprises three stacks of ten Petri dishes, each stack being packaged in a sachet made from a film comprising two PET/PET layers, called FILM B, having a thickness of 27 μm. This film is composed of a first layer of PET having a weight per unit of surface area of 17 g/m² to +/−7% and a thickness of 12 μm, of a layer of (full face) adhesive having a weight per unit of surface area of 3 g/m² and of a second layer of PET having a weight per unit of surface area of 20 g/m² to +/−7% and a thickness of 15 μm. The various mechanical properties of the film thus formed are given in Table 1 below:

TABLE 1

| Parameter | Method used for measuring the parameter | Unit | Nominal value | Tolerance |
|---|---|---|---|---|
| Bond strength | ASTM F-904 | N/15 mm | 2.50 | Minimum: 2 |
| Elongation at break/td | ASTM D-882 | % | 60 | Minimum: 40 |
| Elongation at break/md | ASTM D-882 | % | 90 | Minimum: 70 |
| Resistance to heat-sealing | ASTM F-88 | N/15 mm 180° 0.5" 0.5 Kg | 4 | Minimum: 3 |
| Tensile strength/md | ASTM D-882 | N/15 mm | 60 | Minimum: 40 |
| Tensile strength/td | ASTM D-882 | N/15 mm | 70 | Minimum: 50 |

The first sachet thus formed is then packaged in two successive sachets made from a cellophane film.

The third batch, BATCH 3, comprises three stacks of ten Petri dishes, each stack being packaged in a sachet made from a polyamide film having a thickness of 40 µm and a water vapour permeability of approximately 55 g/m²×24 h, having the reference FILM C. The first sachet thus formed is then packaged in two successive sachets made from a cellophane film. This type of packaging is conventionally used.

The fourth batch, BATCH 4, comprises three stacks of ten Petri dishes, each stack being packaged successively in three sachets made from a polyamide film having a thickness of 40 µm and a water vapour permeability of approximately 55 g/m²×24 h, also having the reference FILM C. This type of packaging constitutes a second prior art.

The water vapour transmission coefficients of films A and B are determined by five measurements according to the abovementioned standard. The results are indicated in Table 2 below.

TABLE 2

Water vapour transmission coefficient
(g/m² · 24 h)

| Reference | Results | | | | | | Mean | Standard Deviation |
|---|---|---|---|---|---|---|---|---|
| FILM A: PET/PE | 17.1 | 16.6 | 16.6 | 17.1 | 17.6 | | 17.0 | 0.4 |
| FILM B: PET/PET | 20.2 | 21.3 | 20.5 | 20.7 | 20.6 | | 20.7 | 0.4 |

The cellophane films used to form the second and third sachets of the first three batches have no influence on the permeability of the assembly formed by the three sachets. Indeed, their water vapour permeability is approximately 600 g/m²×24 h.

Each of the three stacks of the four batches thus formed is then stored for 5 weeks according to several temperature conditions. A first stack of each batch is thus stored at a temperature of between 2 and 8° C. A second stack of each batch is also stored at ambient temperature. A third stack of each batch is finally stored at a temperature of between 30 and 35° C.

The weight of the first and last dish of each of the stacks of each batch is measured every week in order to determine the agar weight loss kinetics as a function of the storage and packaging conditions. The total weight of each stack of each batch is also measured every week. The monitoring of the weight of the agar is an indicator for the amount of water lost by the agar.

The results of these measurements are given in the tables below and in relation to the figures.

Table 3 shows the monitoring of the weight of agar of dishes 1 and 10 of each of the batches, measured week by week for the stacks stored at a temperature of between 2 and 8° C.

TABLE 3

TEMPERATURE 2-8° C.

| | | Week 1 | Week 2 | Week 3 | Week 4 | Week 5 |
|---|---|---|---|---|---|---|
| BATCH 1 | Dish 1 | 16.69 | 16.81 | 16.79 | 16.82 | 16.79 |
| BATCH 2 | Dish 1 | 16.61 | 16.77 | 16.82 | 16.75 | 17.24 |
| BATCH 3 | Dish 1 | 16.39 | 16.29 | 16.29 | 16.3 | 16.33 |
| BATCH 4 | Dish 1 | 16.13 | 16.12 | 16.35 | 15.9 | 16.3 |

TABLE 3-continued

TEMPERATURE 2-8° C.

| | | Week 1 | Week 2 | Week 3 | Week 4 | Week 5 |
|---|---|---|---|---|---|---|
| BATCH 1 | Dish 10 | 16.6 | 16.82 | 16.73 | 16.75 | 16.55 |
| BATCH 2 | Dish 10 | 16.54 | 16.74 | 16.69 | 16.73 | 17.21 |
| BATCH 3 | Dish 10 | 16.27 | 16.33 | 16.17 | 16.37 | 16.25 |
| BATCH 4 | Dish 10 | 16.21 | 16.22 | 16.36 | 15.87 | 16.1 |

Table 4 shows the monitoring of the weight of agar of dishes 1 and 10 of each of the batches, measured week by week for the stacks stored at ambient temperature.

TABLE 4

AMBIENT TEMPERATURE

| | | Week 1 | Week 2 | Week 3 | Week 4 | Week 5 |
|---|---|---|---|---|---|---|
| BATCH 1 | Dish 1 | 16.86 | 16.53 | 16.79 | 16.53 | 16.72 |
| BATCH 2 | Dish 1 | 17.08 | 16.68 | 16.48 | 16.31 | 16.68 |
| BATCH 3 | Dish 1 | 16.13 | 15.79 | 15.31 | 15.5 | 15.07 |
| BATCH 4 | Dish 1 | 16.18 | 15.99 | 16.17 | 15.91 | 15.67 |
| BATCH 1 | Dish 10 | 16.74 | 16.35 | 16.6 | 16.31 | 16.71 |
| BATCH 2 | Dish 10 | 17.07 | 16.75 | 16.54 | 16.27 | 16.6 |
| BATCH 3 | Dish 10 | 16.3 | 16 | 15.35 | 15.68 | 15.45 |
| BATCH 4 | Dish 10 | 16.24 | 16.05 | 16.19 | 15.87 | 15.91 |

Table 5 shows the monitoring of the weight of agar of dishes 1 and 10 of each of the batches, measured week by week for the stacks stored at a temperature of between 30 and 35° C.

TABLE 5

TEMPERATURE 30-35° C.

| | | Week 1 | Week 2 | Week 3 | Week 4 | Week 5 |
|---|---|---|---|---|---|---|
| BATCH 1 | Dish 1 | 16.26 | 16.27 | 15.88 | 15.6 | 15.32 |
| BATCH 2 | Dish 1 | 16.21 | 16.17 | 15.94 | 15.8 | 15.09 |
| BATCH 3 | Dish 1 | 15.26 | 15.06 | 14.05 | 13.1 | 12.5 |
| BATCH 4 | Dish 1 | 15.48 | 15.62 | 14.89 | 14.81 | 14.8 |
| BATCH 1 | Dish 10 | 16.39 | 16.34 | 16.29 | 15.91 | 15.47 |
| BATCH 2 | Dish 10 | 16.55 | 16.33 | 15.76 | 15.53 | 15.24 |
| BATCH 3 | Dish 10 | 15.35 | 15.25 | 14.3 | 13.65 | 13.16 |
| BATCH 4 | Dish 10 | 15.68 | 15.89 | 15.43 | 15.14 | 15.17 |

FIG. 1 shows the measurements of the weights of the complete stacks of dishes week by week for batches 1 to 4. The stacks of the batches shown in this figure are stored at a temperature of between 2 and 8° C.

FIG. 2 shows the measurements of the weights of the complete stacks of dishes week by week for batches 1 to 4. The stacks of the batches shown in this figure are stored at ambient temperature.

FIG. 3 shows the measurements of the weights of the complete stacks of dishes week by week for batches 1 to 4. The stacks of the batches shown in this figure are stored at a temperature of between 30 and 35° C.

The results regarding the agar weight loss kinetics were obtained while maintaining an acceptable level of condensation inside the sachets using FILM A and FILM B in BATCH 1 and BATCH 2, contrary to the sachets using standard plastic films.

Tables 2, 3 and 4 and also FIGS. 1, 2 and 3 thus show a reduction in the agar weight loss kinetics through the use of the films FILM A and FILM B in BATCH 1 and BATCH 2 in comparison with the reference methods illustrated by the batches BATCH 3 and BATCH 4. Furthermore, it is also demonstrated that the use of the films FILM A and FILM B has no effect on the weight loss of the agar as a function of the position of the dish in the stack. Indeed, no significant variation in the agar weight loss kinetics is observed between the first and last dish of the stack.

A decrease in the agar weight loss kinetics is also demonstrated whatever the storage conditions. The influence of the temperature on the agar weight loss kinetics is decreased in comparison with the films used to produce the sachets of the batches BATCH 3 and BATCH 4. Indeed, all storage conditions taken into account, the agar weight loss is decreased for the batches using films FILM A and FILM B. The stacks of batches stored at ambient temperature in films FILM A and FILM B exhibit in particular a slight decrease in weight as the weeks go by, in comparison with BATCH 3 and BATCH 4. Likewise for the stacks of batches stored at a temperature of between 30 and 35° C. in films FILM A and FILM B in comparison with BATCH 3.

Finally, better stability of the agar weight loss kinetics is also demonstrated, whatever the storage conditions, the measurements carried out on batches BATCH 3 and BATCH 4 showing a greater variation in the agar weight loss kinetics over time.

EXAMPLE 2

Various batches of Petri dishes are formed. Each of the batches contains ten agar culture media of 90 mm Lock Sure™ dish type, manufactured by the applicant and sold under bioMérieux reference No. 43811 Trypcase Soy Agar 3P™.

The fifth batch, BATCH 5, comprises three stacks of ten Petri dishes, each stack being packaged in a sachet made from a PET/PE film, called FILM D, having a thickness of 32 μm and a water vapour permeability of approximately 18 g/m²×24 h. This film is composed of a transparent layer of linear low-density polyethylene having a thickness of 20 μm and a weight per unit of surface area of 18.4 g/m² to +/−12%, of a layer of (full face) adhesive having a weight per unit of surface area of 2.5 g/m² to +/−0.6 g/m² and of a transparent layer of PET having a thickness of 12 μm and a weight per unit of surface area of 16.8 g/m² to +/−4%. The first sachet thus formed is then packaged in two successive sachets made from a cellophane film.

The sixth batch, BATCH 6, comprises three stacks of ten Petri dishes, each stack being packaged in a sachet made from a film comprising two PET/PET layers, called FILM E, having a thickness of 27 μm and a water vapour permeability of approximately 25 g/m²×24 h. This film is composed of a first layer of PET having a weight per unit of surface area of 17 g/m² to +/−7% and a thickness of 12 μm, of a layer of (full face) adhesive having a weight per unit of surface area of 3 g/m² and of a second layer of PET having a weight per unit of surface area of 20 g/m² to +/−7% and a thickness of 15 μm. The various mechanical properties of the film thus formed are given in Table 6 below:

TABLE 6

| Parameter | Method used to measure the parameter | Unit | Nominal value | Tolerance |
|---|---|---|---|---|
| Bond strength | ASTM F-904 | N/15 mm | 2.50 | Minimum: 2 |
| Elongation at break/td | ASTM D-882 | % | 60 | Minimum: 40 |
| Elongation at break/md | ASTM D-882 | % | 90 | Minimum: 70 |

TABLE 6-continued

| Parameter | Method used to measure the parameter | Unit | Nominal value | Tolerance |
|---|---|---|---|---|
| Resistance to heat-sealing | ASTM F-88 | N/15 mm 180° 0.5" 0.5 Kg | 4 | Minimum: 3 |
| Tensile strength/md | ASTM D-882 | N/15 mm | 60 | Minimum: 40 |
| Tensile strength/td | ASTM D-882 | N/15 mm | 70 | Minimum: 50 |

The first sachet thus formed is then packaged in two successive sachets made from a cellophane film.

The seventh batch, BATCH 7, comprises three stacks of ten Petri dishes, each stack being packaged in a sachet made from an oriented polypropylene film having a thickness of 30 μm and a water vapour permeability of approximately 5 g/m²×24 h, having the reference FILM F. The first sachet thus formed is then packaged in two successive sachets made from a cellophane film.

The eighth batch, BATCH 8, comprises three stacks of ten Petri dishes, each stack being packaged in a sachet made from a polyamide film having a thickness of 30 μm and a water vapour permeability of between 50 and 80 g/m²×24 h, having the reference FILM G, derived from the prior art. The first sachet thus formed is then packaged in two successive sachets made from a cellophane film.

The cellophane film used to form the second and third sachets has no influence on the permeability of the assembly formed by the three sachets. Indeed, the water vapour permeability thereof is approximately 600 g/m²×24 h.

Each of the three stacks of the four batches thus formed then undergoes a sequence of heat shocks according to the following protocol (Table 7):

TABLE 7

| Storage temperature | Storage time |
|---|---|
| 2-8° C. | Approximately 14 h |
| 35-39° C. | 8 hours |
| 2-8° C. | Approximately 14 h |

Following this sequence of heat shocks, the stacks are stored according to the following conditions for 18 weeks:

A first stack of each batch is stored at a temperature of between 2 and 8° C.

A second stack of each batch is stored at ambient temperature (AT).

A third stack of each batch is finally stored at a temperature of between 30 and 35° C.

An exudation score in each of the sachets forming the first packaging is observed according to the criteria of Table 8 below:

TABLE 8

| | Exudation scale for the sachets: | | | |
|---|---|---|---|---|
| Sachet | Exudation score | Description | Drop diameter | Amounts of water |
| Acceptable} | 0 - dry | No condensation or droplets | 0 | 0 |
| | 1 - condensation | Sachet moist or with area of moisture, no separate drops | <1 mm | 1-100 mg |

TABLE 8-continued

Exudation scale for the sachets:

| Sachet | Exudation score | Description | Drop diameter | Amounts of water |
|---|---|---|---|---|
| Outside of range} | 2 - droplets | Distinct droplets | 1-4 mm | 101-200 mg |
| | 3 - drops | If at least one drop is 4 mm in diameter | >4 mm | 201-350 mg |
| | 4 - water | No separate drops, pool of water in the sachet | No separation of the drops | >350 mg |

This score is determined at T0, that is to say following the sequence of heat shocks, and also once a week on weeks 1, 2, 3, 4, 5, 7, 10, 12, 15 and 18. Table 9 below summarizes the score of these observations as a function of the storage conditions, each week for each sachet.

TABLE 9

Exudation scores for the sachets of films D, E, F and G

| | Week | | | | | | | | | |
|---|---|---|---|---|---|---|---|---|---|---|
| | 1 | 2 | 3 | 4 | 5 | 7 | 10 | 12 | 15 | 18 |
| FILM G sachet T0: 1 | | | | | | | | | | |
| 2-8° C. | 0 | 0 | 1 | 1 | 1 | 0 | 1 | 0 | 1 | 1 |
| AT | 0 | 0 | 0 | 0 | 0 | 0 | 0 | 0 | 0 | 0 |
| 30-35° C. | 0 | 0 | 0 | 0 | 0 | 0 | 0 | 1 | 1 | 1 |
| FILM D Score sachet T0: 3 | | | | | | | | | | |
| 2-8° C. | 1 | 1 | 3* | 0 | 0 | 0 | 0 | 0 | 0 | 0 |
| AT | 0 | 0 | 0 | 0 | 0 | 0 | 0 | 0 | 0 | 0 |
| 30-35° C. | 1 | 1 | 1 | 1 | 1 | 1 | 1 | 1 | 1 | 1 |
| FILM E Score sachet T0: 1 | | | | | | | | | | |
| 2-8° C. | 0 | 0 | 0 | 0 | 0 | 0 | 1 | 0 | 0 | 0 |
| AT | 0 | 0 | 0 | 0 | 0 | 0 | 0 | 0 | 0 | 0 |
| 30-35° C. | 1 | 1 | 1 | 1 | 1 | 1 | 1 | 1 | 1 | 1 |
| FILM F Score sachet T0: 4 | | | | | | | | | | |
| 2-8° C. | 4 | 4 | 2 | 2 | 2 | 2 | 3 | 3 | 2 | 4 |
| AT | 4 | 4 | 3 | 2M | 0 | 0 | 0 | 0 | 0 | 0 |
| 30-35° C. | 1 | 2 | 1 | 1 | 1 | 1 | 1 | 1 | 1 | 1 |

*This poor score is due to the presence of a tear in the sachet before opening. M: presence of agar in the sachet It is thus demonstrated that films D and E according to the invention behave optimally at 2-8° C. and ambient temperature (acceptable score of 0 or even 1) and very correctly at a temperature of between 30-35° C. Conversely, film G causes the exudation in the sachet to significantly deteriorate, both at 2-8° C. and at ambient temperature (scores not acceptable, outside the range since above 1, this lasting for several weeks). Furthermore, the appearance of an undesired suction effect between the lid and the dish is noted.

The weight of the first and of the last dish of each of the stacks of each batch is also measured on weeks 1, 2, 3, 4, 5, 7, 10, 12, 15 and 18 in order to determine the agar weight loss kinetics as a function of the storage and packaging conditions. The total weight of each stack of each batch is also measured every week. The monitoring of the weight of the agar is an indicator of the amount of water lost by the agar.

The results of these measurements of the weights of the stacks of 10 dishes (called "whole system") of each batch are given in FIGS. 4, 5 and 6 according to the storage conditions. A linear regression curve obtained from the measurements corresponding to each batch is also plotted. The affine function thus obtained makes it possible to plot the corresponding curve with x being the number of days of storage and y being the weight of the stack. Each curve obtained is presented in correspondence with each batch. These curves make it possible in particular to estimate the water loss kinetics and to envisage a maximum shelf life of the stack and of the media contained.

These results clearly indicate a limited agar weight loss for films D and E according to the invention, in comparison with film G of the prior art. This control of the exudation of the packaged media thus makes it possible to envisage shelf lives much longer than those proposed by the prior art, in particular lives of 9 months to a year depending on the storage conditions. The recommended shelf life with film G being at the current time at 17 weeks.

Film F is naturally discarded since the water exuded by the culture medium remains stored in the sachet and makes the use of the packaged media impossible.

These results thus make it possible to envisage a reduction in the amount of agar able to be poured into a Petri dish, nevertheless making it possible to ensure a shelf life in keeping with current standards. Conversely, extended shelf lives can be achieved using films according to the invention by retaining a similar amount of poured agar. The use of a film according to the invention therefore allows a reduction in the manufacturing costs and/or an extension of the shelf life of the culture media.

The invention claimed is:

1. A polymer film for packaging at least one microorganism culture medium, said film comprising at least one layer of polyethylene terephthalate and at least one heat-sealing layer, wherein:
    said film has an average water vapour permeability of between 10.0 g/m$^2$×24 hours and 80.0 g/m$^2$×24 hours; and
    said film does not have a coating layer including polyvinyl chloride (PVC) and/or polyvinylidene chloride (PVDC) and is obtained directly by extrusion or complexing.

2. The polymer film according to claim 1, wherein the film comprises a second layer of polyethylene terephthalate.

3. The polymer film according to claim 1, wherein at least one layer is microperforated.

4. The polymer film according to claim 1, wherein the film has a thickness of between 20 and 80 μm.

5. A sachet for the packaging of at least one microorganism culture medium produced from the polymer film according to claim 1.

6. A process for packaging at least one culture medium, comprising:
    placing the culture medium or media on the heat-sealing layer of the polymer film according to claim 1;
    covering the culture medium or media with a portion, which has remained free, of said film or with another film, such that the heat-sealing layers are facing one another; and
    securing the edges of the film or of the two films, such that the culture medium or media is or are trapped in the sachet thus formed.

7. The packaging process according to claim 6, wherein the film(s) is (are) presterilized.

8. The packaging process according to claim 7, wherein the sterilization method is irradiation with radiation selected from the group consisting of gamma-rays and/or beta-rays.

9. The packaging process according to claim 6, wherein the securing step is a heat-sealing step at a temperature of between 100 and 170° C.

10. The packaging process according to claim 6, further comprising:
placing the sachet thus obtained inside a second sachet; and
sealing said second sachet.

11. The packaging process according to claim 10, further comprising:
placing the second sachet thus obtained inside a third sachet; and
sealing said third sachet.

12. The packaging process according to claim 11, wherein said second and/or third sachets are made of a material selected from the group consisting of cellophane, polyolefins and polyamides.

13. The polymer film according to claim 1, wherein the heat-sealing layer comprises polyethylene or polypropylene.

14. The polymer film according to claim 1, wherein said film has an elongation at break of less than 250%.

15. The polymer film according to claim 1, wherein the average water vapour permeability is between 10.0 g/m$^2$×24 hours and 30.0 g/m$^2$×24 hours.

16. A polymer film for packaging at least one microorganism culture medium, said film comprising at least one layer of polyethylene terephthalate and at least one heat-sealing layer, wherein:

said film has an average water vapour permeability of between 10.0 g/m$^2$×24 hours and 30.0 g/m$^2$×24 hours; and said film does not have a coating layer including polyvinyl chloride (PVC) and/or polyvinylidene chloride (PVDC).

17. The polymer film according to claim 16, wherein at least one layer has perforations having sizes of between 10 μm and 50 μm.

18. The polymer film according to claim 16, which provides one or more culture media packaged by said film with a shelf life of greater than 6 months.

19. The polymer film according to claim 16, wherein said film is obtained directly by extrusion or complexing to reduce variability of the water vapour permeability during batch manufacturing.

20. A polymer film for packaging at least one microorganism culture medium, said film comprising at least one layer of polyethylene terephthalate and at least one heat-sealing layer, wherein:

said film has an average water vapour permeability of between 10.0 g/m$^2$×24 hours and 80.0 g/m$^2$×24 hours; and said film is obtained directly by extrusion or complexing to reduce variability of the water vapour permeability during batch manufacturing.

* * * * *